United States Patent
Dong et al.

(10) Patent No.: US 9,626,444 B2
(45) Date of Patent: Apr. 18, 2017

(54) CONTINUOUSLY BLOCKING QUERY RESULT DATA FOR A REMOTE QUERY

(71) Applicant: International Business Machines Corporation, Armonk, NY (US)

(72) Inventors: Margaret A. Dong, San Jose, CA (US); Shivram Ganduri, San Jose, CA (US); James W. Pickel, Gilroy, CA (US); Hugh J. Smith, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/143,683

(22) Filed: May 2, 2016

(65) Prior Publication Data

US 2016/0232251 A1    Aug. 11, 2016

Related U.S. Application Data

(63) Continuation of application No. 14/166,895, filed on Jan. 29, 2014.

(51) Int. Cl.
*G06F 17/30* (2006.01)
*H04L 29/08* (2006.01)

(52) U.S. Cl.
CPC .. *G06F 17/30867* (2013.01); *G06F 17/30283* (2013.01); *G06F 17/30424* (2013.01); *G06F 17/30516* (2013.01); *H04L 67/10* (2013.01)

(58) Field of Classification Search
CPC ................................................. G06F 17/30424
USPC ........................................................ 707/718
See application file for complete search history.

(56) References Cited

U.S. PATENT DOCUMENTS

| | | | |
|---|---|---|---|
| 7,480,650 | B2 | 1/2009 | Miller |
| 7,587,400 | B2 | 9/2009 | Bastawala et al. |
| 7,797,709 | B2 | 9/2010 | Handa et al. |
| 7,979,421 | B2 | 7/2011 | Radestock et al. |
| 8,140,522 | B2 | 3/2012 | Min et al. |
| 8,260,769 | B1 * | 9/2012 | Fuller ............... G06F 17/30457 707/713 |
| 8,316,056 | B2 | 11/2012 | Wable |
| 8,447,739 | B2 | 5/2013 | Naibo et al. |

(Continued)

OTHER PUBLICATIONS

Heilman, Rich, "SAP HANA SQLScript Basics, Debugging, and ABAP Connectivity", SAP HANA Product Management, SAP Labs, LLC, 2013, pp. 1-41, asug Annual Conference.

(Continued)

*Primary Examiner* — Joshua Bullock
(74) *Attorney, Agent, or Firm* — Teddi E. Maranzano

(57) ABSTRACT

Continuously blocking query result data for a remote query is provided. Included is: creating a first connection, using a communications network, between a database server and a client. At least one secondary connection is created, using the communications network, between the database server and the client, based on the database server supporting a continuous block fetch protocol. Using the at least one secondary connection, the database server receives at least one cursor-based fetch query. The database server generates continuous blocks of result data, based on the received at least one cursor-based fetch query and sends to the client, using the at least one secondary connection, the continuous blocks of result data.

1 Claim, 4 Drawing Sheets

(56) References Cited

U.S. PATENT DOCUMENTS

| | | | |
|---|---|---|---|
| 8,484,242 B1 | 7/2013 | Singh et al. | |
| 9,058,357 B1* | 6/2015 | Birnbaum | G06F 17/3048 |
| 9,336,272 B1* | 5/2016 | Thombre | G06F 17/30442 |
| 2006/0218123 A1* | 9/2006 | Chowdhuri | G06F 17/30445 |
| 2010/0042607 A1* | 2/2010 | Min | G06F 17/30445 |
| | | | 707/764 |
| 2012/0130988 A1* | 5/2012 | Nica | G06F 17/30463 |
| | | | 707/718 |
| 2012/0323849 A1 | 12/2012 | Garin, Jr. et al. | |
| 2013/0018918 A1 | 1/2013 | Peek | |
| 2013/0046783 A1 | 2/2013 | Zhang et al. | |
| 2014/0074558 A1* | 3/2014 | Jain | G06Q 10/0637 |
| | | | 705/7.36 |
| 2014/0280032 A1* | 9/2014 | Kornacker | G06F 17/30442 |
| | | | 707/718 |

OTHER PUBLICATIONS

Zhang et al.; "ICEDB: Intermittently-Connected Continuous Query Processing", 2007 IEEE, pp. 166-175.

Grace Period Disclosure: "IBM DB2 11 for z/OS: the database for data and analytics" IBM United States Software Announcement 213-376, dated Oct. 1, 2013, pp. 1-36. Planned availability date of Oct. 25, 2013.

Grace Period Disclosure: IBM DB2 11 for z/OS Managing Performance, SC19-4060-01, Second edition, (Nov. 2013) p. 440.

IBM: List of IBM Patents or Patent Applications Treated as Related (Appendix P), Jul. 15, 2016, 2 pages.

Pending U.S. Appl. No. 14/166,895, filed Jan. 29, 2014, entitled: "Continuously Blocking Query Result Data for a Remote Query", 32 pages.

* cited by examiner

CONTINUOUSLY BLOCKING QUERY RESULT DATA FOR A REMOTE QUERY

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM DB2 V11 for z/OS, made available to the public on Oct. 25, 2013.

FIELD

The present disclosure relates generally to the field of database systems, and more particularly, to continuously blocking result data for a remote query.

BACKGROUND

Minimizing the response time for a query, while maximizing the throughput within the database server as a whole is an important goal of database performance. One way to accomplish this goal is to balance the utilization of system resources, such as network traffic, disk input/output, and CPU usage. Through understanding application characteristics, system resources may be allocated when needed and released when they are no longer needed by the application. In this way, system resources may be available when required by other applications connecting to the database. While some system resources, such as disk and CPU may be dedicated to support the performance of a particular application or database, the network resource may be shared among all the workloads and users within the enterprise. Therefore, an application with a query that returns a large result set may impact the performance of other workloads, as well as that of the application. If the requests and replies between the client and database server can be efficiently managed, network overhead may be reduced and distributed database performance improved.

BRIEF SUMMARY

Among other things, a method for continuously blocking query result data for a remote query is provided. According to an embodiment of the invention, continuously blocking query result data may include: creating a first connection, using a communications network, between a database server and a client; creating at least one secondary connection, using the communications network, between the database server and the client, based on the database server supporting a continuous block fetch protocol; receiving, at the database server, using the received at least one secondary connection, at least one cursor-based fetch query; generating, by the database server, continuous blocks of result data, based on the at least one cursor-based fetch query; and sending to the client, using the at least one secondary connection, the continuous blocks of result data.

In another embodiment, a computer program product for continuously blocking query result data for a remote query may be provided. The computer program product may comprise: a computer readable storage medium readable by a processing circuit and storing instructions for execution by the processing circuit for performing a method comprising: creating a first connection, using a communications network, between a database server and a client; creating at least one secondary connection, using the communications network, between the database server and the client, based on the database server supporting a continuous block fetch protocol; receiving, at the database server, using the received at least one secondary connection, at least one cursor-based fetch query; generating, by the database server, continuous blocks of result data, based on the at least one cursor-based fetch query; and sending to the client, using the at least one secondary connection, the continuous blocks of result data.

In another embodiment, a computer system for continuously blocking query result data for a remote query may be provided. A computer system may comprise: one or more processors, one or more computer-readable storage devices, and a plurality of program instructions stored on at least one of the one or more storage devices for execution by at least one of the one or more processors, the plurality of program instructions comprising: a computer readable storage medium readable by a processing circuit and storing instructions for execution by the processing circuit for performing a method comprising: creating a first connection, using a communications network, between a database server and a client; creating at least one secondary connection, using the communications network, between the database server and the client, based on the database server supporting a continuous block fetch protocol; receiving, at the database server, using the received at least one secondary connection, at least one cursor-based fetch query; generating, by the database server, continuous blocks of result data, based on the at least one cursor-based fetch query; and sending to the client, using the at least one secondary connection, the continuous blocks of result data.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
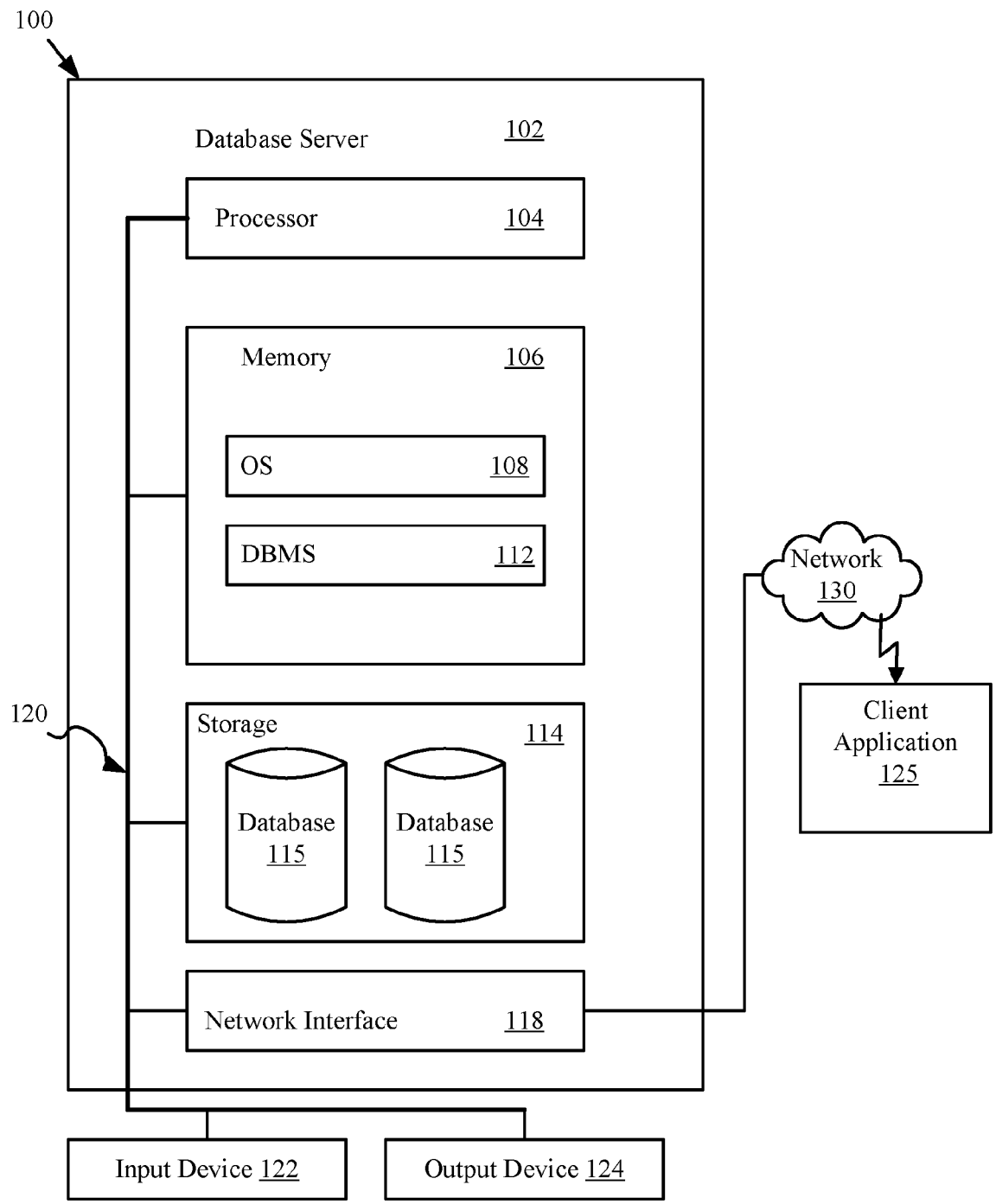
FIG. 1 is a block diagram illustrating an exemplary embodiment of a system for continuously blocking query result data for a remote query.
Figure 2:
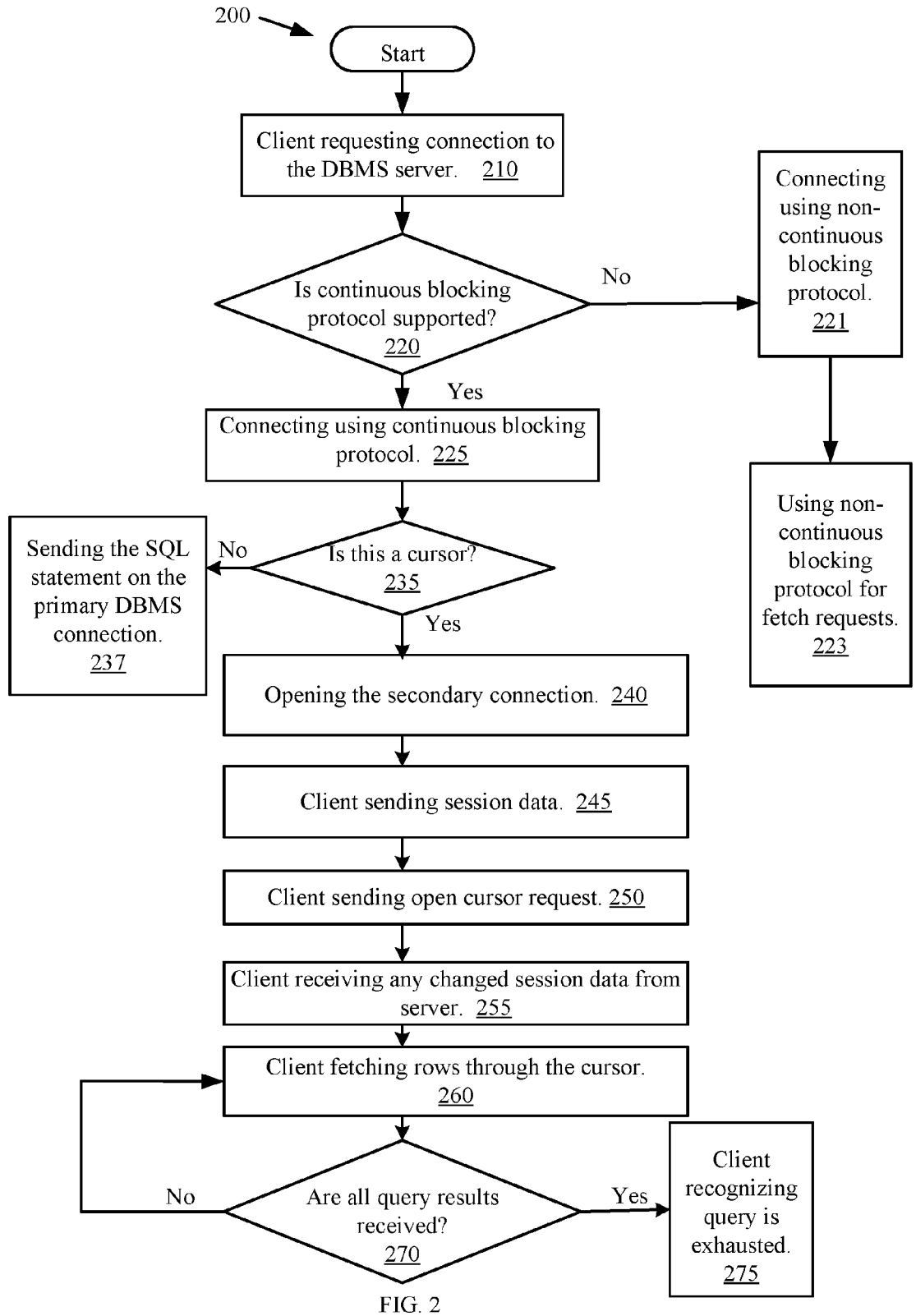
FIG. 2 is a flow diagram illustrating an exemplary embodiment of a method for continuously blocking query result data for a remote query from the client perspective.
Figure 3:
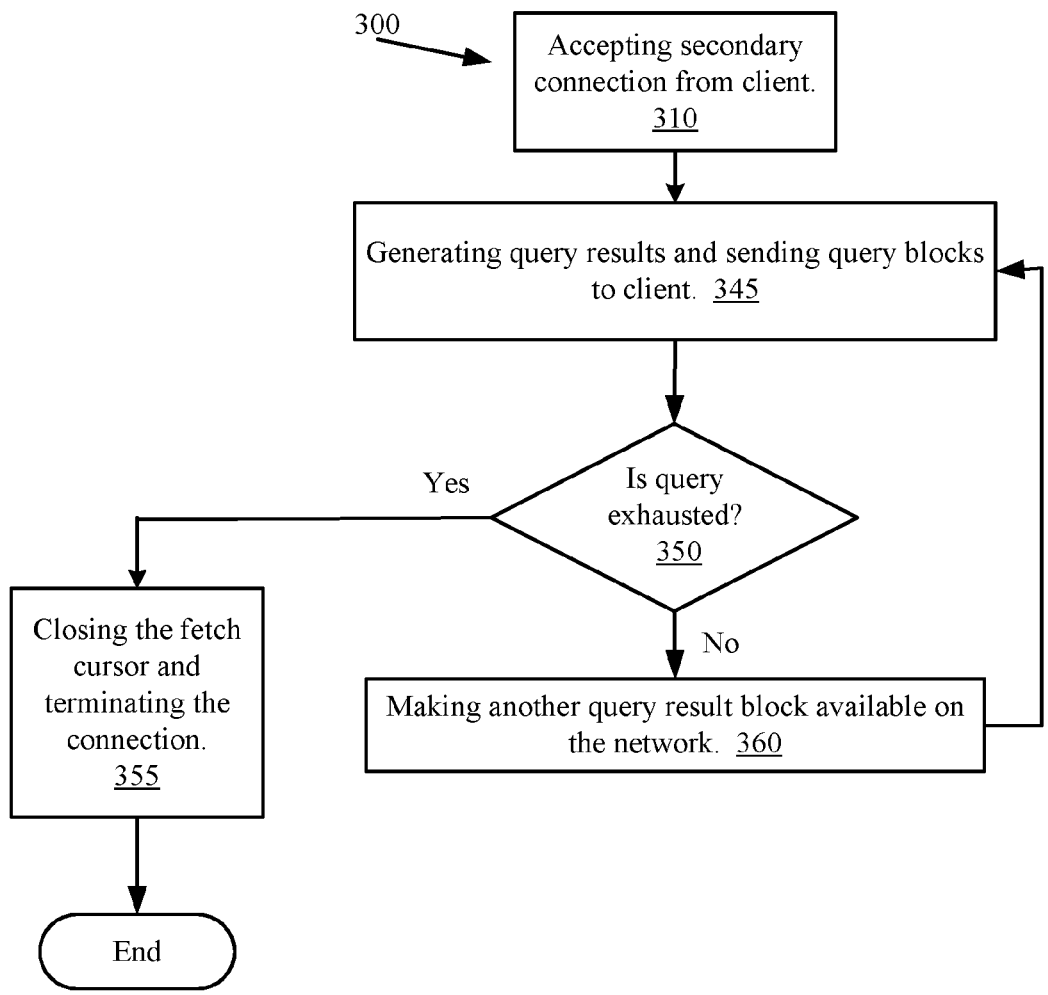
FIG. 3 is a flow diagram illustrating an exemplary embodiment of a method for continuously blocking query result data for a remote query from the database server perspective.

Embodiments of the present invention will now be described with reference to the figures. Referring to FIGS. 1-3, an exemplary implementation for continuously blocking query result data for a remote query is provided.

FIG. 1 is a block diagram of an exemplary embodiment of a system 100 for continuously blocking query result data for a remote query. The networked system 100 includes a database server 102. The database server 102 may also be connected to other computers and servers via a network 130.

The network 130 may include connections, such as wire, wireless communication links, or fiber optic cables.

The database server 102 generally includes a processor 104 connected via a bus 120 to a memory 106, a network interface device 118, a storage 114, an input device 122, and an output device 124. The database server 102 is generally under the control of an operating system 108, such as for example Linux. However, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger formats. The network interface device 118 may be any type of network communications device allowing the database server 102 to communicate with other computers via the network 130.

The storage 114 may be a persistent storage device. Although the storage 114 is shown as a single unit, the storage 114 may be a combination of fixed and/or removable storage devices, such as fixed disc drives, solid state drives, floppy disc drives, tape drives, removable memory cards or optical storage. The memory 106 and the storage 114 may be part of one virtual address space spanning multiple primary and secondary storage devices.

The input device 122 may be any device for providing input to the database server 102. For example, a keyboard and/or a mouse may be used. The output device 124 may be any device for providing output to a user of the database server 102. For example, the output device 116 may be any conventional display screen or set of speakers. Although shown separately from the input device 122, the output device 124 and input device 122 may be combined, as in a display screen with an integrated touch-screen.

As shown, the memory 106 of the database server 102 includes one or more software modules comprising the DBMS 112 and configured to manage one or more databases 115, contained in the storage 114 of the database server 102. Each database 115 may store control structures for the DBMS 112, such as system catalog tables, in addition to application data.

The client application 125 may be configured as a separate workstation or other computer that is remote from the database server 102. In this context, remote refers to a client using a network connection, such as the network 130, to communicate with the database server 102.

The particular description in FIG. 1 is for illustrative purposes only; it should be understood that the invention is not limited to specific described embodiments, and any combination is contemplated to implement and practice the invention.

Referring now to FIG. 2, a client's perspective of an exemplary embodiment for continuously blocking query result data for a remote query is provided. A client may connect to a database server even though the two are geographically dispersed. For example, the compiled client application is linked together with vendor-supplied library modules that publish common routines and application programming interfaces (API) so that the client and database server can communicate with each other. The routines assist the client and database server in negotiating mutually agreeable parameters and protocols that may govern the connection. Other information, referred to as session data or global variables, may be exchanged between the database server and client, and may persist for the duration of the connection. Session data that is shared by several applications, such as a printer name, an accounting period, or a department identifier, may be stored in a database table for retrieval and use by the client in subsequent structured query language (SQL) statements after the connection is established.

In the database server environment, several database statements may be interleaved on the same network connection between the database server and the client. For a fetch query, the client sends a request to the database server for data. The result is returned to the client a block of data at a time. In this configuration, which may be referred to as block fetch or "send/request", after processing a block of result data, the client sends a request to the database server for the next block of result data. The client then waits for the subsequent reply from the database server which may contain another block of result data, or a message that the query is exhausted. When the reply contains large amounts of data, the database server must keep the client's thread active and wait until either the client closes the network connection or ends the transaction.

At 210 the client 125 (FIG. 1) requests a connection to a database server 102 (FIG. 1). In general when designing the SQL queries and type of database connection, a developer takes into consideration the nature and volume of data that is likely to be fetched. When the developer expects large result sets from the remote query, a continuous block fetch protocol may be preferred over the block fetch model discussed above. The continuous block fetch protocol may reduce network overhead since multiple "send/request" interactions between the client 125 (FIG. 1) and database server 102 (FIG. 1) are avoided. Network latency may be improved by allowing the client 125 (FIG. 1) to establish additional connections, i.e., secondary connections, with the database server 102 (FIG. 1) to process multiple remote queries in parallel. In addition, database server utilization may be improved since the database server 102 (FIG. 1) may implicitly close the fetch cursor and terminate the query once it recognizes that all the result data blocks have been generated.

At 220 the client 125 (FIG. 1) requests that the continuous block fetch protocol be used for the cursor-based fetch query, i.e., a SQL query that fetches data through a cursor. However at 221, the database server 102 (FIG. 1) may not support the continuous block fetch protocol. This may occur, for example, when the database server product is at an older version that does not contain the continuous block fetch protocol feature. In that case, although the connection may be successfully made, the client's functionality will be limited to only those features the database server supports. Therefore, at 223 the client 125 (FIG. 1) is limited to block fetch, described previously. However at 220, if both the client 125 (FIG. 1) and database server 102 (FIG. 1) support it, and the client 125 (FIG. 1) requests it, at 225 the connection will be established using the continuous block fetch protocol. The client 125 (FIG. 1) may generate more than one cursor-based fetch query at a time, and request the continuous block fetch protocol for each one. Using the continuous block fetch protocol, a secondary connection, i.e., thread, is opened for each cursor-based fetch query generated by the client 125 (FIG. 1). The query result data blocks are returned to the client 125 (FIG. 1) using the secondary connection corresponding to the cursor-based fetch query.

If the SQL statement at 235 is not for a cursor-based fetch query, then at 237 the SQL statement is sent to the database server 102 (FIG. 1) using the established primary connection. If at 235 the SQL statement is for a cursor-based fetch query, then at 240 the client 125 (FIG. 1) opens the secondary connection. When the client 125 (FIG. 1) opens the secondary connection, at 240 the client sends, along with the request, the current set of session data being used within the transaction at 245. This ensures that the database server 102 (FIG. 1) recognizes this new secondary connection as belonging to the same transaction as any other open connection within the transaction, be it the primary connection or any of the secondary connections. At 250, the client sends the open cursor request to the database server 102 (FIG. 1) using its newly opened secondary connection (from 240). Since the database server 102 (FIG. 1) recognizes the secondary connections as belonging to the same transaction as the primary connection, the session data participates in maintaining the consistent context of the transactional relationship between the database server 102 (FIG. 1) and the client 125 (FIG. 1). For example, being separate queries, any of the connections may modify the transaction's session data. Therefore, to keep session data synchronized across all the connections in the transaction, the database server 102 (FIG. 1) may return changed session data when responding to a communication from the client, such as establishing a new secondary connection or returning query results. Consequently, at 250 when the client 125 (FIG. 1) sends the open cursor request to the database server 102 (FIG. 1) using the new secondary connection, the database server 102 (FIG. 1) responds with any changed session data at 255, thus keeping the session data consistent.

As part of the open cursor request at 250, the client 125 (FIG. 1) identifies the secondary connection as read-only, and sends the size of the query block that the client 125 (FIG. 1) can hold in memory at any time. Additionally, the client 125 (FIG. 1) identifies the secondary connection as part of the same transaction as the primary connection. This prevents resource or lock contention among the connections within the transaction. For example, the client 125 (FIG. 1) may choose to generate more than one cursor-based fetch query using the continuous block fetch protocol. Accordingly, a secondary connection is established for each of these queries, and the client 125 (FIG. 1) may fetch data from any of the secondary connections in any order, depending upon the logic of the application. The database server 102 (FIG. 1) recognizes that each of the secondary connections is part of the same transaction, and may share transaction logs for the transaction across all the secondary connections. Consequently, locking and other contention errors may be avoided. Processing may now continue in parallel on the database server 102 (FIG. 1), where the blocks of query result data are prepared for transmission to the client 125 (FIG. 1). Accordingly, the remainder of FIG. 2 (i.e., 260, 270, and 275) will be discussed in the context of the database serve 102 (FIG. 1) in FIG. 3 below.

Referring now to FIG. 3, a database server's perspective of an exemplary embodiment for continuously blocking query result data for a remote query is provided. At 310 the database server 102 (FIG. 1) accepts the client's 125 (FIG. 1) request to open the cursor for a secondary connection. At 345, the database server 102 (FIG. 1) opens the cursor and begins to continuously generate and send query result data blocks using the block size provided by the client 125 (FIG. 1). Along with a query result data block, the database server 102 (FIG. 1) may also return any session data that another query in another connection may have changed. As described previously, the session data participates in maintaining the context of the transactional relationship between the database server 102 (FIG. 1) and the client 125 (FIG. 1). However, since each secondary connection represents a separate query, one of the connections, or the primary connection, may potentially modify the transaction's session data. To keep session data synchronized across all the connections in the transaction, the database server 102 (FIG. 1) may return changed session data using the secondary connections when sending query result data blocks to the client 125 (FIG. 1). Using the continuous block fetch protocol, the database server 102 (FIG. 1) sends the generated query result data block to the client 125 (FIG. 1) on the network 130 (FIG. 1) over the secondary connection established for that query until the query is satisfied, i.e., exhausted. The database server 102 (FIG. 1) terminates the process and closes the query's secondary connection when there are no more query results to transmit to the client 125 (FIG. 1).

As long as the database server 102 (FIG. 1) determines that the query is not exhausted, at 350 another query result data block may be generated for the client 125 (FIG. 1) and transmitted over the secondary connection at 360. However, the database server 102 (FIG. 1) adheres to the network's congestion protocols in pacing the transmission of subsequent query result data blocks. Therefore, the database server 102 (FIG. 1) may transmit as much data as the client 125 (FIG. 1) reads from the secondary connection, preventing the network 130 (FIG. 1) and the client 125 (FIG. 1) from being flooded with data. When the query is exhausted, at 355 the database server 102 (FIG. 1) terminates the process and closes the secondary connection for the associated cursor-based fetch query.

The client 125 (FIG. 1) begins fetching rows from the returned query result data block at 260 (FIG. 2). When the client 125 (FIG. 1) attempts to fetch the next row at 270 (FIG. 2), if the query result data block still contains data, the client 125 (FIG. 1) may continue to fetch rows at 260 (FIG. 2) from the returned query result data block. When the client 125 (FIG. 1) finishes fetching the rows in the current query block at 270 (FIG. 2), but has not received a notification from the database server 102 (FIG. 1) that the query is exhausted, the network's congestion protocols may indicate to the database server 102 (FIG. 1) that the client 125 (FIG. 1) can receive the next block of query results. Accordingly, as long as the database server 102 (FIG. 1) determines that the query is not exhausted at 350, another query result data block may be generated for the client 125 (FIG. 1) and transmitted over the secondary connection at 360. The client 125 (FIG. 1) may continue to fetch rows from the query result data blocks, until at 270 (FIG. 2) the client 125 (FIG. 1) detects, for example, by a condition code that the query is exhausted.

Figure 4:
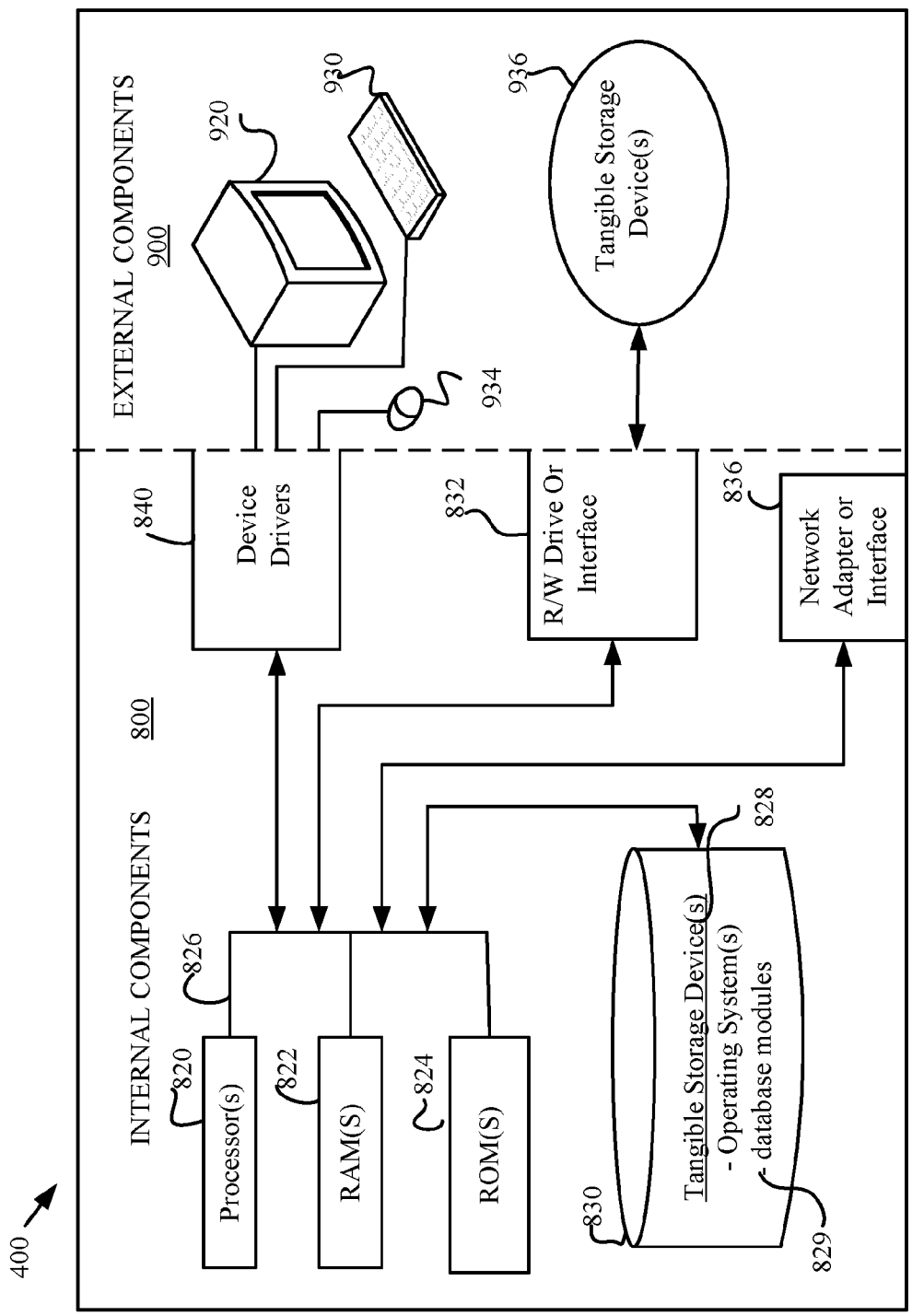
FIG. 4 is a schematic block diagram of hardware and software of the computer environment according to an embodiment of the method of FIGS. 2-3.

Referring now to FIG. 4, computing device 400 may include respective sets of internal components 800 and external components 900 that together may provide an environment for a software application, such as a database management system (DBMS). Each of the sets of internal components 800 includes one or more processors 820; one or more computer-readable RAMs 822; one or more computer-readable ROMs 824 on one or more buses 826; one or more operating systems 828; one or more software applications (e.g., DBMS modules 829) executing the method 200; and one or more computer-readable tangible storage devices 830. The one or more operating systems 828 and DBMS modules 829 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The DBMS modules 829, and operating system 828 that are associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for continuously blocking query result data for a remote query comprising:
    opening a first connection, using a communications network, between a database server and a client;
    opening one or more secondary connections, using the communications network, between the database server and the client, based on the database server supporting a continuous block fetch protocol, wherein each of the one or more secondary connections corresponds to a separate cursor-based fetch query, and wherein the one or more secondary connections and the first connection belong to a same transaction, share session data of the same transaction, and comprises a single session between the database server and the client;
    for each of the one or more secondary connections, receiving, by the database server, the corresponding separate cursor-based fetch query;
    in response to the received separate cursor-based fetch query, sending, by the database server, to the client, continuous blocks of result data using the secondary connection corresponding to the separate cursor-based fetch query until the separate cursor-based fetch query is exhausted, and wherein the database server adheres to network congestion protocols in pacing the sending the continuous blocks of result data; and
    closing the secondary connection corresponding to the separate cursor-based fetch query when the continuous blocks of result data is exhausted.

* * * * *